(No Model.) 2 Sheets—Sheet 1.
J. CORBAN & J. F. GREEN.
CAR COUPLING.
No. 435,287. Patented Aug. 26, 1890.
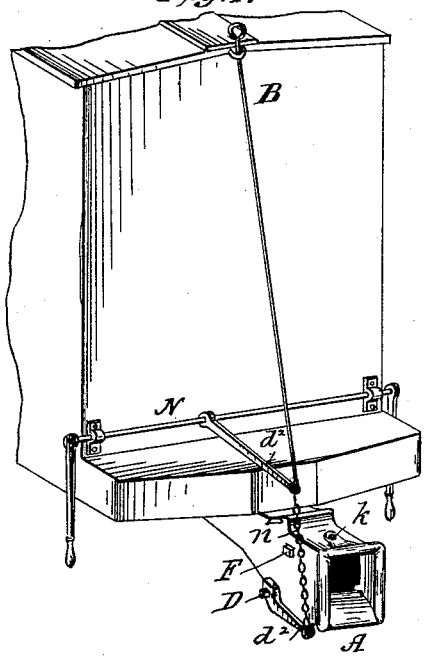
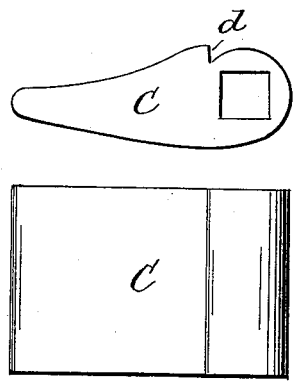
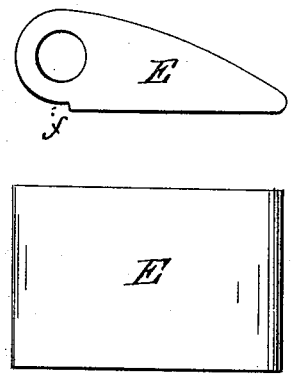
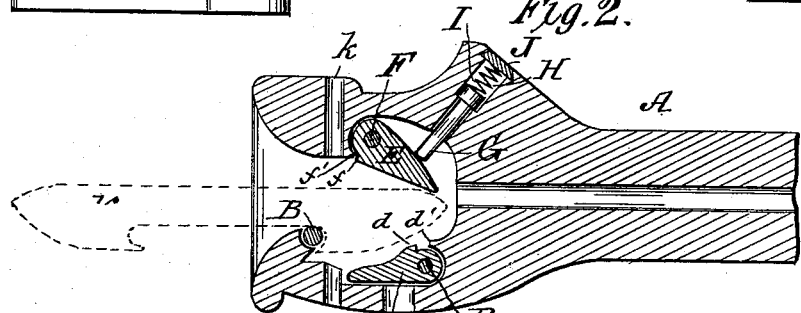
Witnesses
Sam'l R. Turner.
Van Buren Hillyard.
Inventor
John Corban
John F. Green
By their Attorneys
R. S. & A. W. Lacey (No Model.) 2 Sheets—Sheet 2.
J. CORBAN & J. F. GREEN.
CAR COUPLING.

No. 435,287. Patented Aug. 26, 1890.

Witnesses
Sam'l R. Turner.
Van Buren Hillyard.

Inventor
John Corban.
John F. Green.
By their Attorney

UNITED STATES PATENT OFFICE.

JOHN CORBAN AND JOHN F. GREEN, OF PIEDMONT, OHIO.

CAR-COUPLING.

SPECIFICATION forming part of Letters Patent No. 435,287, dated August 26, 1890.

Application filed June 2, 1890. Serial No. 353,918. (No model.)

*To all whom it may concern:*

Be it known that we, JOHN CORBAN and JOHN F. GREEN, citizens of the United States, residing at Piedmont, in the county of Harrison and State of Ohio, have invented certain new and useful Improvements in Car-Couplings; and we do hereby declare the following to be a full, clear, and exact description of the invention, such as will enable others skilled in the art to which it appertains to make and use the same.

This invention relates to car-couplings of that class which are automatic in their action and which can be uncoupled from the top or either side of the car.

The object of the invention is to provide a coupling that is adapted for the special link, and which is also adapted for use in connection with the ordinary link and pin.

A further object of the invention is to provide a coupling which will be simple in construction, comprise few parts, and which will be durable and sufficient.

The improvements consist of the novel features and peculiar construction and combination of the parts, which will be hereinafter more fully described and claimed, and which are shown in the accompanying drawings, in which—

Figure 6:
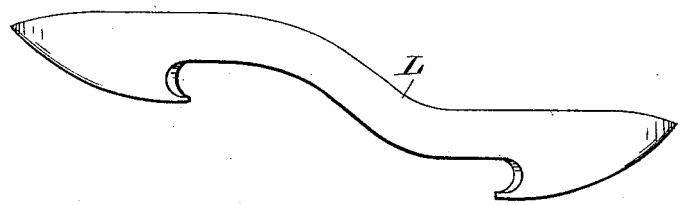
Figure 7:
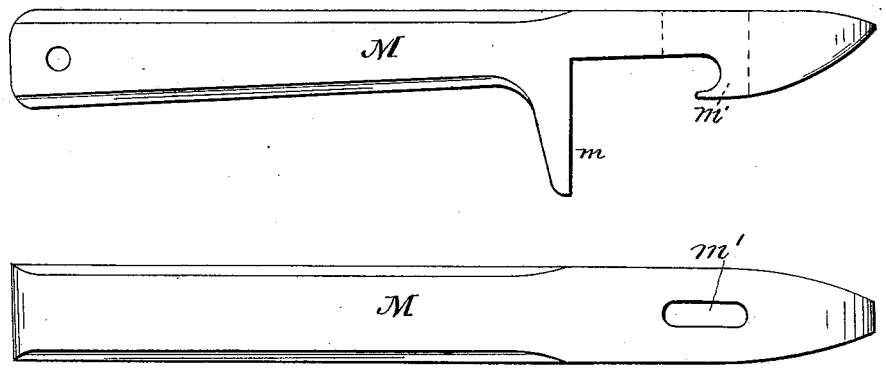
Figure 8:
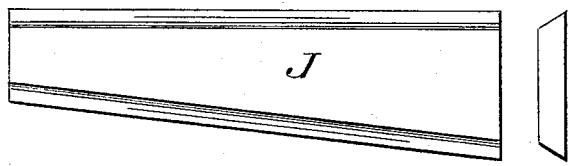

Figure 1 is a perspective view of the end of a car, showing the application of our invention. Fig. 2 is a central longitudinal section of the coupling, showing the coupling-link in position by dotted lines. Fig. 3 is a side and top plan view of the link-lifter. Fig. 4 is a side and top plan view of the pressure-plate. Fig. 5 is a side view of the pin for holding the pressure-plate in engagement with the link. Fig. 6 is a side view of a link to be used with cars of different heights. Fig. 7 is a side and top plan view of the bar which connects the tender with the train. Fig. 8 is a detail view of the slide which holds the spring in place that is mounted on the pin which is in engagement with the pressure-plate.

The draw-bar or bumper A is of ordinary external appearance and is secured to the car in any well-known manner. The mouth of the draw-bar flares to guide the link into the throat thereof. The rod B, preferably of tempered steel or other hard substance, is inserted through coincident openings in the sides of the draw-bar and fits snugly against the inner side of the lower portion of the mouth, and is designed to receive the wear and strain of the link. This rod can be replaced when worn.

The link-lifter C is mounted at its inner end on the shaft D, which is journaled at its ends in the side of the draw-bar. That portion of the shaft D which comes opposite the throat in the draw-bar is made square, and the opening in the link-lifter C, through which the shaft D is inserted, is made of a corresponding shape to receive the square portion of the shaft D, whereby a turning of the shaft will cause an upward motion of the free end of the lifter and disengage the link from the rod B. The shoulder $d$ of the link-lifter is adapted to engage with a corresponding shoulder $d'$ at the inner end of the throat and limit the upward movement of the said link-lifter.

The pressure-plate E is mounted on a pin F, which is inserted through openings in the sides of the draw-bar, and inclines downwardly to press on the inner end of the link and hold the same in a horizontal position. The shoulder $f$ on the pressure-plate E engages with a corresponding shoulder $f'$ at the upper side of the throat and limits the downward movement of the free end of the said pressure-plate. The pin G, inserted through an opening H formed obliquely in the upper side of the draw-bar, engages with the free end of the pressure-plate and holds the same in engagement with the coupling-link. The head of the pin G is enlarged and the upper portion of opening H is correspondingly enlarged to permit a free movement of the pin G therein. The spring I, inserted in the enlarged portion of opening H, presses on pin G and holds the same in engagement with the pressure-plate E, the upper end of the spring obtaining a pressure on the slide-plate J, which is dovetailed and slides in a corresponding dovetail groove in the upper side of the draw-bar. By removing plate J the pin G and spring I can be removed through the upper end of the opening H. The draw-bar is provided with the opening $k$, through which an ordinary pin passes when the coupling is to be used in ordinary manner with the well-known link. The link tapers at each end, and is provided with a hook which is adapted to engage with the rod B when the car uncouples. The link may be straight, as shown at K in Fig. 2, or it may be deflected between its ends, as shown at L in Fig. 6, which is to be used when cars of different heights are to be coupled together.

The coupling-bar M is shaped at its end precisely the same as the end of the coupling-link, and in addition thereto is provided with the stop $m$, which engages with the end of the draw-bar and prevents lost motion. The opening $m'$ near the outer end of the coupling-bar M is designed to receive a coupling-pin which passes through it and through opening $k$ in the draw-bar, thereby securely coupling the engine to the train.

In practice, when the cars are run together, the end of the link entering the draw-bar engages with the pressure-plate E, which forces its hooked end downward and causes an engagement thereof with the rod B. To uncouple the cars, the shaft D is turned, thereby lifting the free end of the link-lifter C and disengaging the link from the rod B. This shaft D may be operated from either side of the car by means of the handles on the shaft N, which shaft is connected with the crank $d^2$ on shaft D by the chain $n$. This shaft N may be operated from the top of the car by means of the rod B.

Having thus described our invention, what we claim, and desire to secure by Letters Patent, is—

1. In a car-coupling, the combination, with the draw-bar, of the pressure-plate and a spring-actuated pin adapted to press on and hold the pressure-plate in engagement with the inner end of the link, substantially as and for the purpose described.

2. In a car-coupling, the combination, with the draw-bar having a shoulder $d'$, of the link-lifter having a corresponding shoulder $d$, substantially as described, for the purpose specified.

3. In a car-coupling, the combination, with the draw-bar having shoulder $d'$ and the link-lifter having a corresponding shoulder $d$, of the shaft D, journaled at its ends in the side of the draw-bar, and having a square portion which is inserted in a correspondingly-shaped opening in the link-lifter, substantially as set forth.

4. The combination, with the draw-bar having an oblique opening, as H, and the pressure-plate, of the pin G, inserted in the said opening H, the spring I, and the plate J, substantially as and for the purpose described.

5. A coupling-bar, as M, having stop $m$ and opening $m'$, substantially as and for the purpose described.

In testimony whereof we affix our signatures in presence of two witnesses.

JOHN CORBAN.
JOHN F. X GREEN.
his mark

Witnesses:
G. P. COLLINS,
J. R. HIBBS.